United States Patent [19]

Coleman et al.

[11] Patent Number: 4,724,750

[45] Date of Patent: Feb. 16, 1988

[54] DOUBLE-WALLED CHIMNEY

[75] Inventors: Karen A. Coleman, Surf City, N.J.; Bob D. Oberg, Buda, Ill.; Gary L. Reinback, Kewanee, Ill.; Robin L. Rediger, Buda, Ill.

[73] Assignee: Van-Packer Company, Buda, Ill.

[21] Appl. No.: 937,787

[22] Filed: Dec. 4, 1986

[51] Int. Cl.$^4$ ............................................. F16L 9/18
[52] U.S. Cl. .................................. 98/60; 138/112; 138/114; 138/148; 126/307 R; 285/47; 285/133.1
[58] Field of Search .................... 98/60; 138/111, 112, 138/113, 114, 148, 149; 126/307 R; 285/47, 133.1

[56] References Cited

U.S. PATENT DOCUMENTS

| 3,872,780 | 3/1975 | Zanias | 98/60 |
| 3,902,744 | 9/1975 | Stone | 285/47 |
| 4,029,344 | 6/1977 | Stone | 285/47 |
| 4,182,378 | 1/1980 | Dieter | 138/114 |

Primary Examiner—Albert J. Makay
Assistant Examiner—David W. Westphal
Attorney, Agent, or Firm—Henderson & Sturm

[57] ABSTRACT

A double-walled chimney comprising inner and outer concentric pipes providing an annular insulating space between them is made up of coaxial end-to-end inner pipes surrounded by concentric, coaxial outer pipes. The inner pipes meet at a junction transverse or radial to the basic axis and are interconnected by an inner, annular ring. The outer pipes stop axially short of meeting so that an annular gap exists that exposes or opens to the junction of the inner pipes. Circumferentially spaced apart spacers are secured to the inner ring and project outwardly as well as axially in opposite directions to engage the outer pipes to keep the latter spaced outwardly from the inner pipes and further to stabilize the outer pipes axially. An outer band connects the outer pipes together and functions also to close the gap between the outer pipes and thus to complete the insulating space at the outer pipe gap.

9 Claims, 7 Drawing Figures

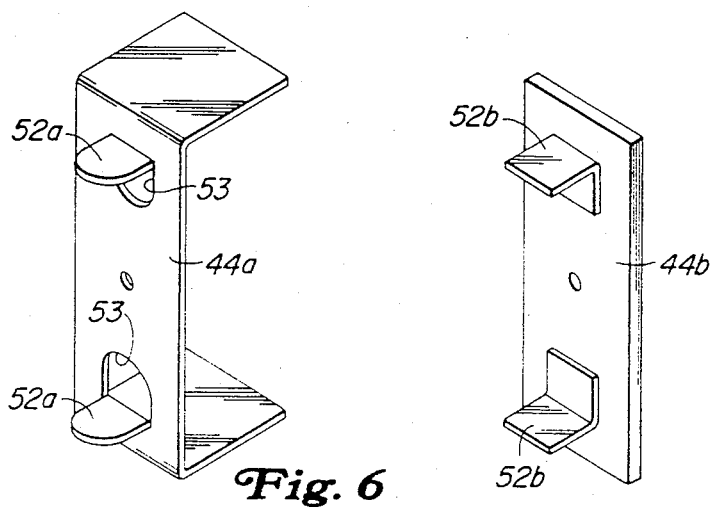
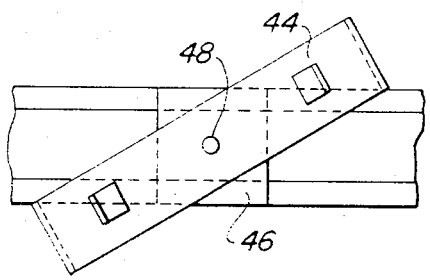
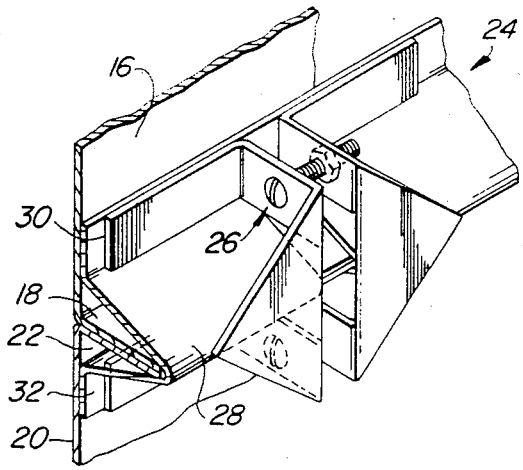

[4,724,750]

DOUBLE-WALLED CHIMNEY

BACKGROUND AND SUMMARY OF THE INVENTION

Double-walled chimneys are known in the art, one example of which is disclosed in the U.S. Pat. 3,902,744 to Stone and prior art cited therein. The basic construction involves inner and outer concentric pipes affording an annular insulating space between them. Fundamentally, the assembly or erection of the chimney proceeds with coaxial, end-to-end stacking of, say, a pair of inner pipes, the meeting ends of which are radially outwardly flanged to receive an inner annular ring which clamps the pipes together. An outer lower pipe surrounds the lower of the inner pipes and its upper end stops axially short of the junction between the inner pipes. An upper outer pipe is assembled from above and its lower end stops above and axially short of the inner piipe junction, the space or gap between the proximate ends of the outer pipes exposing or opening to the inner band. It is in this area that spacing means is most advantageously employed, not only to space the outer pipes from the inner pipes but also to stabilize the outer pipes axially preparatory to the attachment of an outer band around the outer pipes which functions to secure the outer pipes together and to close the gap and thus to complete the insulating space between the pipes.

In one form of the prior art, the spacers are affixed to the interior of the outer pipes and extend inwardly and axially to be received or embraced by the band for the inner pipes. This type of installation requires a degree of care in seeing that the inner band be subsequently tightened to secure the spacers. Since there are several such spacers, considerable time is required to make the proper assembly.

According to the present invention, the spacers are affixed to the inner band and are projectable into proper relationships to the outer pipes with a minimum of attention. A further feature is that the inner band may be tightened before the assembly of the upper outer pipe. Still further, the spacers are pivoted to the inner bands on axes radial to the band and may be turned about their pivots to facilitate installation, besides which the pivoting enables turning of the spacers to lie generally along the periphery of the band so as to contribute to easy handling, packing and shipping.

Further features will become apparent as preferred embodiments of the invention are disclosed in detail in the ensuing description and accompanying sheets of drawings.

DESCRIPTION OF THE DRAWINGS

FIG. 4 is a somewhat enlarged perspective of the means for connecting meeting ends of the inner band.

FIG. 5 is a fragmentary view of one form of spacer, shown in a turned position relative to the inner band.

FIG. 6 is a perspective of a modified form of spacer.

FIG. 7 is a perspective of a further modified form of spacer.

DETAILED DESCRIPTION OF PREFERRED EMBODIMENTS OF THE INVENTION

Figure 1:
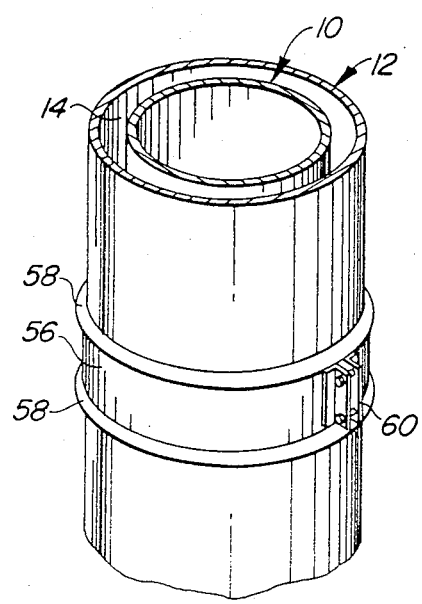
FIG. 1 is a small-scale fragmentary perspective of the inventive chimney as seen from its outside.

As best seen in FIG. 1, the double-walled chimney comprises inner and outer concentric pipes 10 and 12, respectively, providing an annular insulating space 14 between them. Since the typical chimney installation is vertical, the components will be described in terms of an upright orientation, it being understood that such "geographical" terminology does not delimit the scope of the invention.

Figure 2:
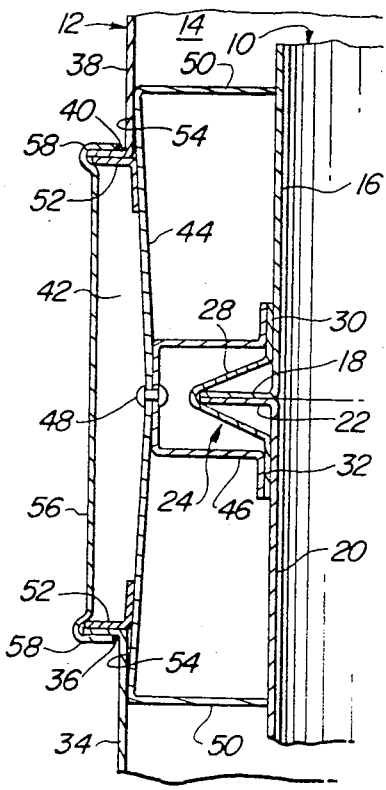
FIG. 2 is an enlarged section through the inner and outer assembled pipes at one side of the axis of the chimney.
Figure 3:
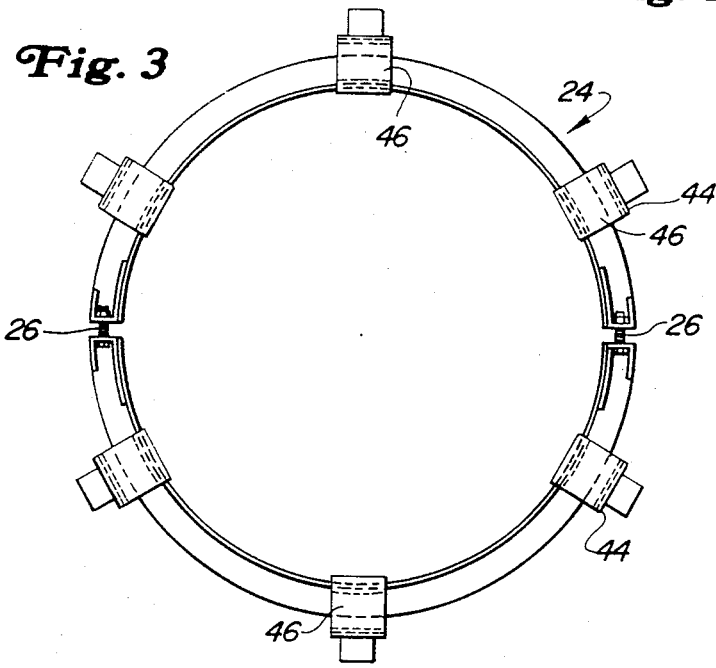
FIG. 3 is a plan of the inner band assembly.

FIG. 2 is referred to as best showing the invention in detail. The inner pipe assembly comprises an upper cylindrical sheet metal pipe 16 having a lower, annular flange 18 disposed in end-to-end relation to a similar lower pipe 20 which has an annular flange 22 abutting the upper pipe flange 18. Whether prefabricated or assembled at the site, the two pipes are interconnected by an inner band or ring assembly 24, best seen in FIG. 3 as being made up of two semi-circular halves joined together at diametrically opposite portions by bolt and nut assemblies 26. FIG. 4 best shows the configuration of the band components as being of V-shaped section at 28 and having upper and lower flanges 30 and 32. The V-shaped configuration acts to draw the pipe flanges together in substantially gas-tight fashion and the flanges 30 and 32 embraces proximate portions of the upper and lower pipes, respectively. The band may be made of two halves in order to facilitate assembly by avoiding unnecessary distortion of the band were it made in C-form. The specific form of band disclosed is not intended to limit the scope of the invention, for other types may be used to perform similar functions. Nevertheless, as will appear later herein, the band has certain inventive features in conjunction with spacers to be described.

Pursuing the assumption that an on-site assembly is involved, it is seen that a lower outer pipe 34 concentrically surrounds the lower inner pipe and has a top end provided with an annular radial flange 36 which is spaced at a level below that of the inner band 24. Likewise, an upper outer pipe 38 loosely surrounds the upper inner pipe and has a lower annular radial flange 40 spaced axially short of and above that junction. There is thus provided an annular gap 42 of substantial axial extent between the upper and lower outer pipes, which gap opens to or preliminarily exposes the inner band 24. It will be further noted that the upper pipe, without more, must be temporarily disposed in the disclosed position until further assembly is made.

This further assembly includes a plurality of spacers 44 circumferentially spaced about and mounted on the inner band 24 by means including, for each spacer, a mounting clip 46 and pivot 48. The clips are rigid on the band, as being spot-welded to the band. The pivots may be rivets lightly set to enable turning of the spacers from the position of FIG. 5 to one in which the spacers are upright, as suggested by FIG. 2. The position of the spacers as in FIG. 5 will facilitate assembly, handling, etc. as previously mentioned.

Each spacer has opposite ends bent inwardly to provide ears 50 which engage the upper and lower inner pipes when the spacers are finally positioned (FIG. 2). Each spacer, being of springy metal, may be biased as shown in FIG. 2 to exert lateral forces between the pipes, the bias occurring mainly at the associated pivot 48 and thus tightly retaining the relationship among the pipes and spacers. The length of each ear as measured in a direction radially of the assembly is on the order of the radial dimension of the insulating space 14. This relationship, plus the provision on each spacer of upper and lower ledges 52, axially stabilizes the outer pipes. Each ledge is a welded-on angle and is spaced axially from its associated ear so as to afford a pilot area 54, these areas respectively engaging interior surface portions of the upper and lower outer pipes and serving to guide the upper pipe into proper place, and ledges adding axial support for the flanges 36 and 40 and the ears providing proper spacing. With all parts functioning in their piloting, seating and spacing capacities, the gap 42 between the outer pipes is closed by an outer band 56 which has upper and lower in-turned flanges 58 for engaging with the outer pipe flanges 36 and 40 from below and above, respectively, to draw the outer pipes axially together and thus to establish a substantially gas-tight junction. The ends of the outer band are typically interconnected by screws 60.

FIG. 6 shows a modified form of spacer 44a in which ledges 52a are formed by partially punching out portions of the spacer at 53. FIG. 7 shows a further form of spacer 44b which is made of heavier stock and omits the ears 52 of the other spacers, although having the welded on L-shaped ledges 52b like those of the spacer 44.

It will be seen from the foregoing that a simple yet sturdy and efficient structure has been provided which accommodates itself to all the requirements of the assembly of inner and outer chimney or flue pipes in the environment disclosed. Features and advantages not specifically pointed out will become apparent to those versed in the art all of which may be achieved without departure from the spirit and scope of the invention.

I claim:

1. A double-walled chimney comprising upper and lower cylindrical inner pipes of like diameter arranged in end-to-end relation on a common vertical axis and respectively having radial end flanges abutting each other at a horizontal junction, inner band means encircling and securing the flanges together at the junction, upper and lower cylindrical outer pipes of greater diameter than the inner pipes and inner band means and concentrically encircling the inner pipes to provide an annular insulating space, the outer upper and lower pipes respectively having lower and upper ends spaced axially apart respectively above and below the horizontal junction to afford an annular space opening to the junction, a plurality of upright spacers disposed within the insulating space and arranged in angularly spaced apart relation about the inner band means, each spacer having upper and lower terminal ends radially inwardly of and respectively axially above and below the lower and upper ends of the upper and lower outer pipes, and each spacer further having upper and lower ledge portions respectively just axially short of its upper and lower ends and projecting radially outwardly to respectively engage beneath and on top of the lower and upper ends of the outer pipes, a plurality of means respectively mounting the spacers on the inner band means, and outer band means encircling the outer pipes and closing the aforesaid annular space.

2. The chimney of claim 1, in which the upper and lower terminal ends of each spacer fit respectively closely within the interior surfaces of the respective outer pipes to provide pilots facilitating assembly of the chimney.

3. The chimney of claim 1, in which each spacer has upper and lower ears respectively adjacent its upper and lower ends and projecting radially inwardly to respectively engage the inner pipes respectively above and below the horizontal junction.

4. The chimney of claim 1, in which the means mounting each spacer on the inner band includes a pivot on a radius of the inner band means for enabling the spacer to be moved angularly out of and back to its upright position.

5. The chimney of claim 1, in which each ledge on each spacer is a separate element added to and affixed to the spacer.

6. The chimney of claim 1, in which each ledge on each spacer is an integral part of the spacer displaced out of the plane of the spacer.

7. The chimney of claim 1, in which each spacer is composed of sufficiently rigid material so as to resist radially inward bending and thereby maintaining the insulating space between the pipes.

8. The chimney of claim 1, in which the mounting means for each spacer includes a support affixed to the inner band means at the horizontal junction and projecting outwardly from the inner band means, and the spacers are mounted respectively on the supports.

9. The chimney of claim 8 in which each spacer is mounted on its support by a pivot radial to the pipe axis enabling the spacer to be turned angularly out of and back to its upright position.

* * * * *

UNITED STATES PATENT AND TRADEMARK OFFICE
CERTIFICATE OF CORRECTION

PATENT NO. : 4,724,750

DATED : February 16, 1988

INVENTOR(S) : Karen A. Coleman, Bob D. Oberg, Gary L. Reinback and Robin L. Rediger It is certified that error appears in the above-identified patent and that said Letters Patent are hereby corrected as shown below:

In Column 1, line 29 "piipe" should read --pipe--. In Column 1, lines 34-35 "care in seeing that the inner band be subsequently tightened to secure the spacers." should read --care in seeing that the inner band received the spacers, besides which the inner band must be subsequently tightened to secure the spacers.--.

Signed and Sealed this

Twenty-third Day of August, 1988

Attest:

DONALD J. QUIGG

Attesting Officer

Commissioner of Patents and Trademarks